(12) United States Patent
Pionetti et al.

(10) Patent No.: US 8,942,552 B2
(45) Date of Patent: Jan. 27, 2015

(54) PLASTIC TUBULAR CONNECTING SLEEVE FOR A PIPE WITH INTERNAL LINER

(75) Inventors: François-Régis Pionetti, La Baleine (FR); Xavier Rocher, Chatou (FR)

(73) Assignee: Saipem S.A., Montigny le Bretonneux (FR)

( * ) Notice: Subject to any disclaimer, the term of this patent is extended or adjusted under 35 U.S.C. 154(b) by 180 days.

(21) Appl. No.: 13/811,711

(22) PCT Filed: Jul. 25, 2011

(86) PCT No.: PCT/FR2011/051783
§ 371 (c)(1),
(2), (4) Date: Jan. 23, 2013

(87) PCT Pub. No.: WO2012/017171
PCT Pub. Date: Feb. 9, 2012

(65) Prior Publication Data
US 2013/0114945 A1    May 9, 2013

(30) Foreign Application Priority Data

Aug. 6, 2010    (FR) ...................................... 10 56488

(51) Int. Cl.
*H05B 3/58*    (2006.01)
*H05B 3/02*    (2006.01)
*F16L 1/15*    (2006.01)
*F16L 1/20*    (2006.01)
*F16L 13/02*    (2006.01)
*F16L 47/03*    (2006.01)
*F16L 58/18*    (2006.01)
*H01C 17/00*    (2006.01)

(52) U.S. Cl.
CPC ... *H05B 3/02* (2013.01); *F16L 1/15* (2013.01); *F16L 1/206* (2013.01); *F16L 13/0263* (2013.01); *F16L 47/03* (2013.01); *F16L 58/181* (2013.01); *H01C 17/00* (2013.01)
USPC .............................. 392/472; 392/479; 285/41

(58) Field of Classification Search
None
See application file for complete search history.

(56) References Cited

U.S. PATENT DOCUMENTS 2,992,457 A * 7/1961 Harrison ........................ 264/230
3,506,519 A * 4/1970 Blumenkranz ............. 156/274.2

(Continued)

FOREIGN PATENT DOCUMENTS

EP          0722824       7/1996
WO    WO2006/042925    4/2006
WO    WO2010/041016    4/2010

*Primary Examiner* — Thor Campbell
(74) *Attorney, Agent, or Firm* — Cozen O'Connor

(57) ABSTRACT

A pipe having at least two steel pipe elements with internal lining that are assembled together end to end, with the ends of the two pipe elements being welded together. A tubular junction sleeve is interposed inside the pipe at the abutting ends of the two pipe elements so that the end terminal portions of the sleeve are at least in part in leaktight contact with respective ones of the terminal portions at the ends of the internal linings of the two pipe elements. The leaktight contact zone is a zone of fusion welding together the materials in mutual contact constituting at least a portion of each terminal portion of the sleeve and of each respective terminal portion of the lining. At each of the terminal portions of the sleeve in the leaktight contact zone, the tubular junction sleeve presents a Joule effect heater wire arranged in a double spiral on the outer surface of each terminal portion at the ends of the sleeve.

15 Claims, 8 Drawing Sheets

(56) References Cited

U.S. PATENT DOCUMENTS

| | | | | |
|---|---|---|---|---|
| 3,943,334 A | * | 3/1976 | Sturm | 219/544 |
| 3,998,682 A | * | 12/1976 | Harmsen | 156/158 |
| 4,176,274 A | * | 11/1979 | Lippera | 219/522 |
| 4,220,180 A | * | 9/1980 | Koga et al. | 138/120 |
| 4,274,662 A | * | 6/1981 | de Groot et al. | 285/21.1 |
| 4,295,668 A | * | 10/1981 | Louthan et al. | 285/21.1 |
| 4,365,144 A | * | 12/1982 | Reich et al. | 219/535 |
| 4,436,988 A | * | 3/1984 | Blumenkranz | 219/544 |
| 4,618,168 A | * | 10/1986 | Thalmann et al. | 285/21.2 |
| 4,649,641 A | * | 3/1987 | Sichler | 29/611 |
| 4,718,698 A | * | 1/1988 | Hill | 285/21.2 |
| 4,770,442 A | * | 9/1988 | Sichler | 285/21.2 |
| 4,842,305 A | * | 6/1989 | Kistenich et al. | 285/21.2 |
| 4,852,914 A | * | 8/1989 | Lyall | 285/21.2 |
| 5,141,580 A | * | 8/1992 | Dufour et al. | 156/158 |
| 5,286,952 A | * | 2/1994 | McMills et al. | 219/535 |
| 5,364,130 A | * | 11/1994 | Thalmann | 285/21.2 |
| 5,398,974 A | * | 3/1995 | Mizukawa et al. | 285/21.2 |
| 5,478,118 A | * | 12/1995 | Barq et al. | 285/21.2 |
| 6,131,954 A | * | 10/2000 | Campbell | 285/21.1 |
| 6,680,464 B1 | * | 1/2004 | Carter et al. | 219/544 |
| 6,781,099 B2 | * | 8/2004 | Krah | 219/544 |
| 7,614,661 B1 | * | 11/2009 | Ruffle et al. | 285/21.1 |
| 7,767,938 B2 | * | 8/2010 | Krah | 219/520 |
| 8,418,565 B2 | * | 4/2013 | Herremans et al. | 73/861 |
| 2012/0211119 A1 | * | 8/2012 | Rule et al. | 138/155 |

* cited by examiner

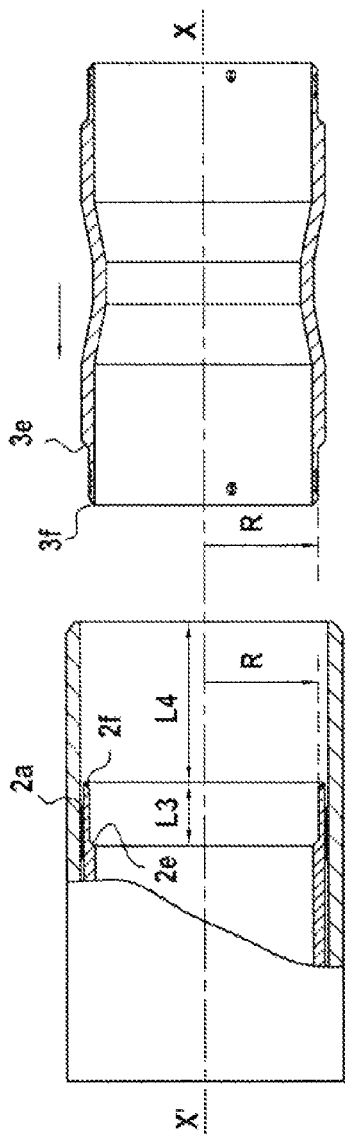
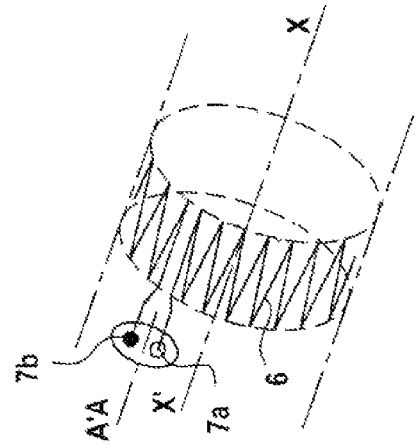
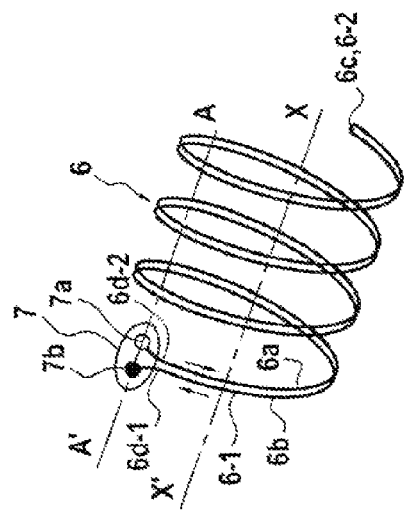
FIG.2
FIG.2A
FIG.2B

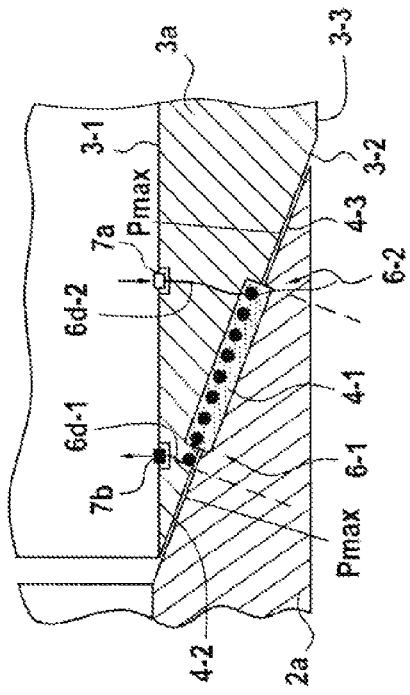
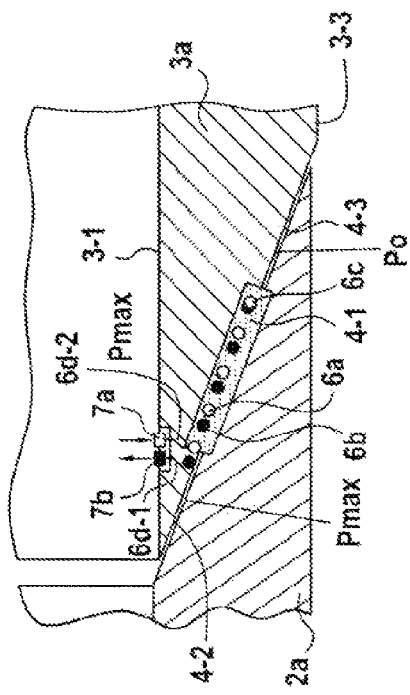
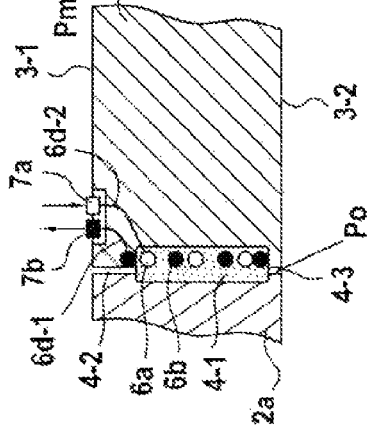

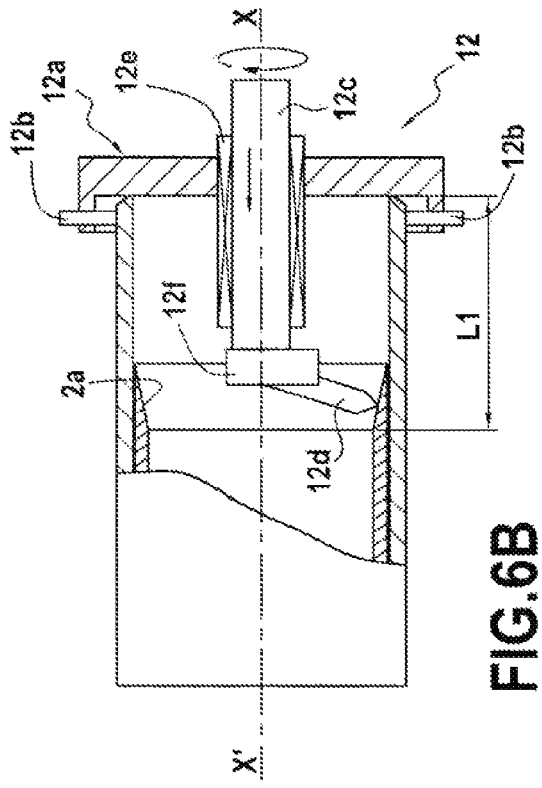
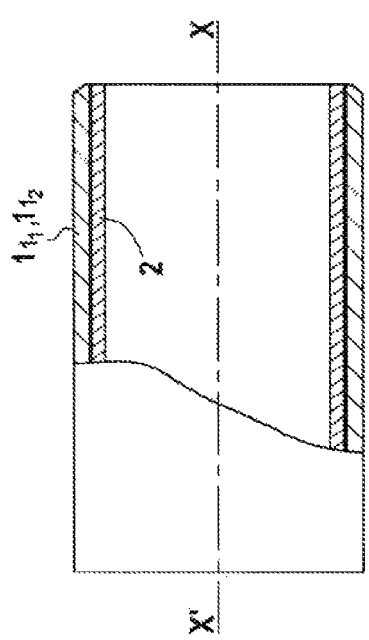
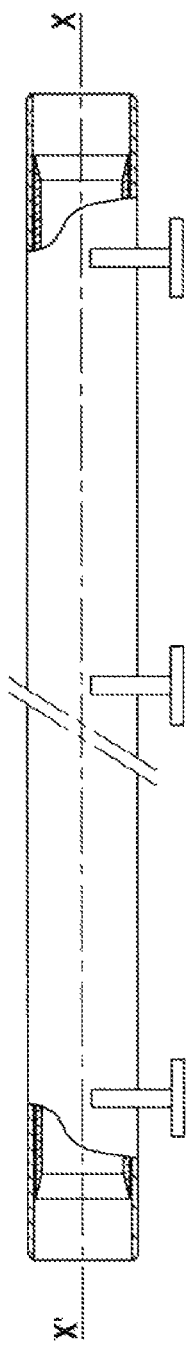

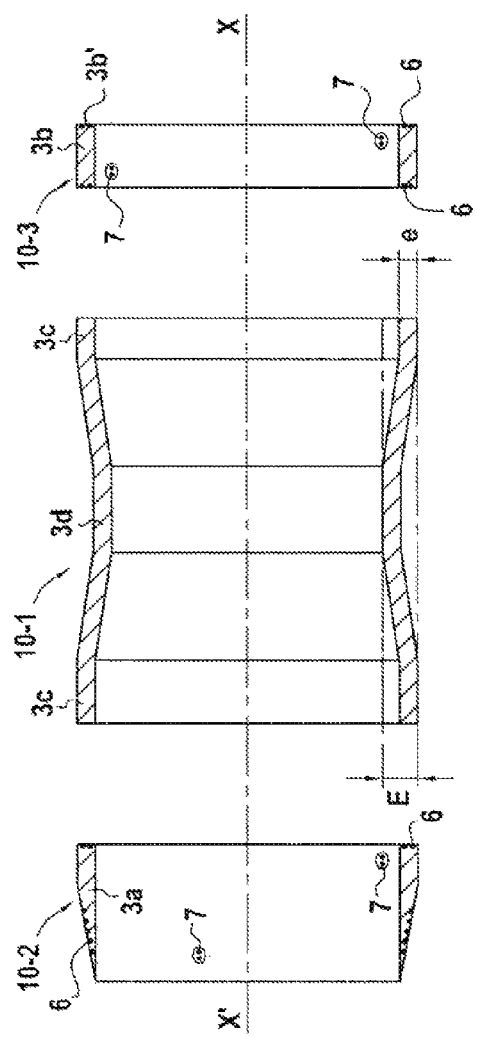
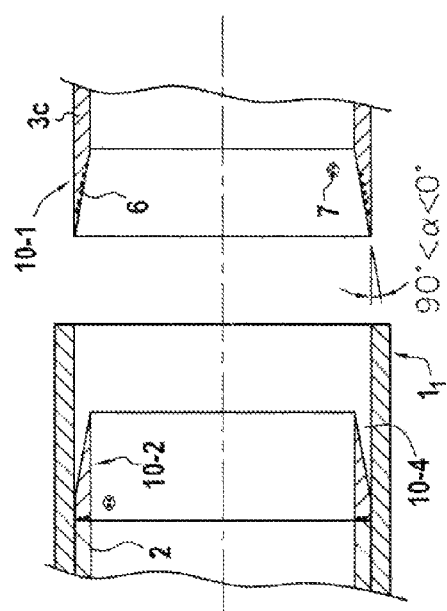

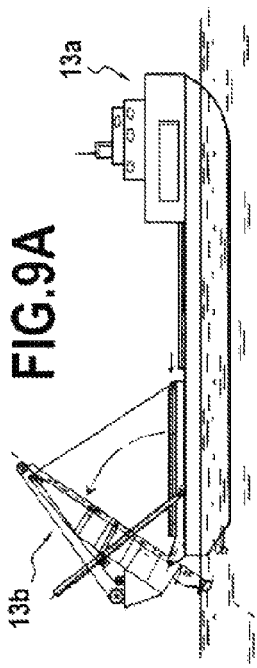
FIG.9A
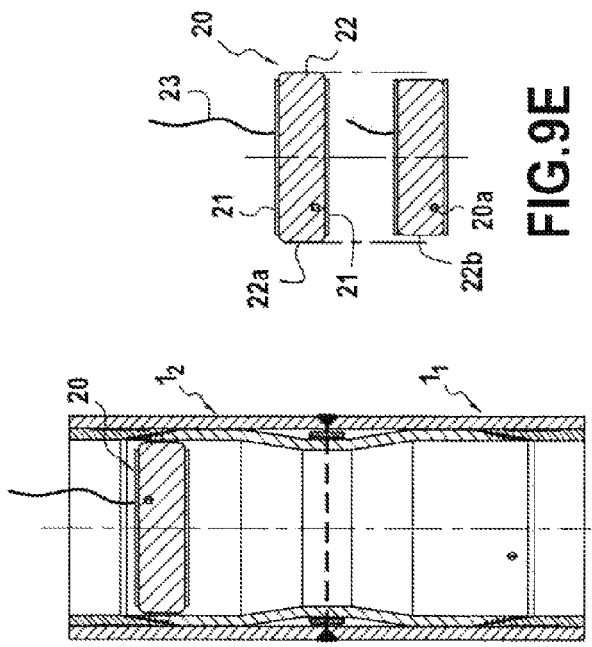
FIG.9E
FIG.9D
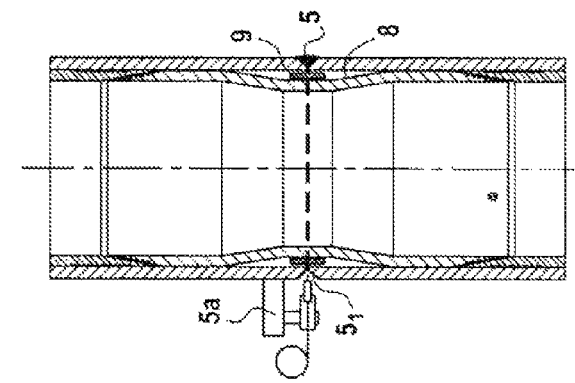
FIG.9C
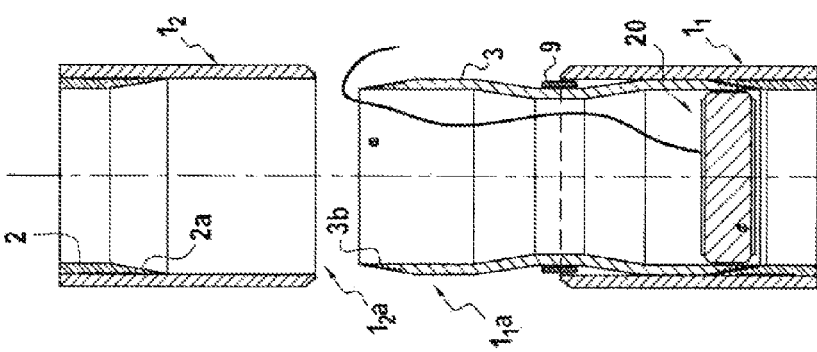
FIG.9B

PLASTIC TUBULAR CONNECTING SLEEVE FOR A PIPE WITH INTERNAL LINER

RELATED APPLICATIONS

This is a U.S. national stage of application No. PCT/FR2011/051783, filed on Jul. 25, 2011. Priority is claimed on the following application: France Application No.: 1056488 filed on Aug. 6, 2010, the content of which is incorporated here by reference.

FIELD OF THE INVENTION

The present invention relates to a pipe made by assembling together steel pipe elements each having an internal lining of plastics material protecting the steel walls of said pipe from corrosion.

More particularly, the present invention relates to pipes for conveying corrosive fluids, in particular undersea pipes conveying sea water under pressure for injection into wells in oil fields, and still more particularly bottom-to-surface connection pipes.

BACKGROUND OF THE INVENTION

The present invention relates more particularly to connecting together two internally-lined unit pipe elements, and more particularly elements presenting a length of 24 meters (m) or 48 m that are installed in oil fields in deep water, e.g. in depths of 2000 m to 3000 m, or even more, from a laying ship fitted with J-lay towers.

In known manner, the ends of said pipe elements are assembled together end to end by welding, and the internal lining inside said pipe elements comes to an end at a significant distance from each end of said pipe elements, e.g. a distance of 100 millimeters (mm) to 200 mm, so that the heating of the steel wall while the ends are being welded together does not damage said lining. There is then a problem of how to protect against corrosion the non-lined zone extending between the end of the lining of pipe element No. N and the end of the lining in the following pipe element No. N+1.

Patent WO 2006/042925 in the name of the Applicant discloses such an assembly of pipes provided with internal linings. The so-called "swagelining" method of providing the internal lining consists in stretching a circular pipe of flexible material, referred to below as the "liner", so as to reduce its diameter in order to be capable of being inserted in a pipe by being pulled, the rest diameter of said lining being greater than the inside diameter of said pipe. Another way of inserting such a liner is to deform it in folding so as to obtain a cross-section in the form of a kidney bean that can be inscribed inside a circle of much smaller diameter, thereby allowing it to be inserted merely by being pulled through the steel pipe. At the and of being pulled through, the ends that project considerably naturally return to a substantially circular shape and it is simple to fit a plug thereon. By pressurizing the liner with compressed air, it returns to its circular shape and said liner is pressed firmly against the inside wall of the steel pipe.

In that patent WO 2006/042925, a way of assembling together two pipe elements is described in which a tubular junction sleeve of corrosion-resistant steel or of composite material serves to provide continuity in the protection of the pipe walls over the non-lined ends of said pipe elements. More particularly, a tubular junction sleeve is described that consists in a ferrule of corrosion-resistant alloy in the form of a tubular sleeve having a surface of revolution on the inside with notches at its ends and engaged by force in each of the ends of said pipe elements for assembly so as to create increased leaktightness and continuity for the internal lining at the junction between the two pipe elements.

The terms "liner" or "internal lining" as used herein correspond to an internal covering commonly known as a "liner".

It is important for the contact between the sleeve and the liner to be leaktight in order to avoid any sea water making contact with the welding zone facing said tubular sleeve.

In the event of water penetrating between the sleeve and the pipe, and when the pipe is a water injection pipe, such direct contact could lead to electrochemical corrosion phenomena of the steel pipe and of the weld, assuming that said mechanical connection between the sleeve and the lining is not necessarily leaktight.

Other, ways of assembling two pipe elements or two strings are described in numerous parents mentioned in WO 2006/042925.

The main drawback of the various methods of assembling strings together lies in the fact that the junction is heterogeneous between a coupling element made of metal and a liner made of thermoplastic material, which coupling is based on a principle of compressing the thermoplastic material of the liner, and, in the long term, the liner can suffer seep that has the consequence of leading to leaks should sealing no longer be ensured between the end of the lining and the end of the sleeve, which goes against the looked-for purpose. Furthermore, that phenomenon is amplified in catenary type bottom-to-surface connection pipes since such pipes are permanently in movement under the effect of swell, wind, and currents acting on the anchored floating support on the surface, thereby creating micromovements in each of the coupling elements, which are generally spaced apart by the length of one string, i.e. generally once every 24 m or 48 m.

In WO 2006/042925, notching of the ends of the lining creates compression that co-operates with notching of the ends of the sleeve in order to compensate for such seep.

In a known tubular junction sleeve associated with a pipe comprising at least two pipe elements made of steel with internal lining made of thermoplastic material that are assembled together end to end, the ends of the two pipe elements being welded together:

said tubular junction sleeve is made of a thermoplastic material, preferably identical to the material of said lining, and it is inserted inside the pipe at the abutting ends of the two pipe elements so that the terminal portions at the ends of said sleeve are at least in part in leaktight contact with the respective terminal portions at the ends of said internal linings of the two pipe elements; and said tubular junction sleeve presents at each of said terminal portions of the sleeve in said zone of leaktight contact with the terminal portions of said linings a said Joule effect heater wire arranged in a spiral on the outer surface of each said terminal portion at the ends of said sleeve, said leaktight contact zone being a zone of fusion welding together the component materials in mutual contact of each said terminal portion of the sleeve and of each said respective terminal portion of said lining, with said heater wire passing therethrough.

However a pipe of that type with a tubular junction sleeve having a single strand spiral-wound heater wire as described in FIGS. 3B and 4B of the present description, in which the two ends of the spiral-wound single strand wire lead from opposite ends of the spiral on the inner surface of the sleeve at the two ends of said electrofusion zone with leaktight zones can give rise to problems of loss of sealing representing a risk of sea water coating into contact with the metal welding forming the junction between the two pipe elements, when said pipe is used to convey water. This means also, and above all, that said sleeve runs the risk of deforming and in particular of returning to its initial shape of smaller inside diameter in its central zone facing the metal weld between the ends of the two abutting pipe elements, as shown on the left in FIG. 1, if it had such an initial shape; this is because, as a result of said leak, the zone 8 between the outer surface of the sleeve and the inner surfaces of said pipe elements is then at a pressure that is substantially identical to the pressure that exists inside said sleeve, and given the elasticity of said sleeve it naturally returns to its initial shape. This risk of losing sealing arises for the reasons explained below.

Firstly there is no guarantee of sealing through the thickness of the terminal portion of the sleeve along the pre-drilled channel taken by a non-spiral-wound free end of the heater wire in order to pass through the thickness of said sleeve from the first and second ends of the spiral to the inner surface of the sleeve. Furthermore, the zone of leaktight contact obtained by electrofusion or the fusion-welding zone does not cover all of the contact area between said terminal portions of the sleeve and of said respective internal liners, and in particular fusion does not occur with an acceptable level of reliability in the vicinity of the first and last turns of the spiral since although the supply of heat is well controlled between two adjacent turns, it is not well controlled before the first turn or after the last turn. Thus, in the event of said heater wire covering an outer surface of revolution, in particular a cylindrical surface or a frustoconical surface, the interface between the terminal portions of the sleeve and of said respective linings is not leaktight outside the electrofusion zone, i.e. before the first turn or after the last turn. Thus, the channel for the end of the wire at the first end of the spiral closest to the closest end of the sleeve has access to the non-sealed portion of this interface that exists before said first end of the spiral, and that leads solely to the inner surfaces of the sleeve and of the pipe as a whole. In contrast, the channel for the end of the wire at the second end of the spiral closest to the running portion of the sleeve accesses the portion of this non-sealed interface that exists beyond said second and of the spiral leading solely to the outer surface of the sleeve and capable of giving access to said weld. Under such circumstances, if one of the non-spiral-wound free ends of the wire goes from the second end of the spiral to return to the inner surface of the sleeve, then a fluid under pressure, and in particular water, conveyed by the pipe, in particular with service pressures greater than 5 megapascals (MPa) as is usual, can present a high risk of seeping along said wire through the thickness of the sleeve to said second end and then to said weld via said interface extending between said second end of the spiral and the outer surface of the current portion of the sleeve.

WO 2010/041016 and EP 0 722 824 propose a tubular junction sleeve having a spiral-wound heater wire on its outer surface for which the problem of sealing the metal weld against leaks via the channel or furrow for passing the heater wire through the mass of the sleeve is solved.

In EP 0 722 824, the problem of sealing is solved, by causing the end of the wire beside the electrofusion zone closest to the weld to lead to the outer surface of the sleeve in a central setback, which setback is designed to be plugged by an insulating material after electrofusion and before making the metal weld. Thus, in EP 0 722 824, it is necessary to make the metal weld after electrofusion of the sleeve, and said electrofusion cannot be performed exclusively from inside said sleeve and thus inside said pipe.

In document WO 2010/041016, as shown in FIG. 1, a heater wire is used that is arranged in two spaced-apart helical portions, the furthest-apart ends of the two helical portions being connected together, and the two ends of the heater wire lead to the inner surface of the sleeve beside the gap between the two helical portions. Thus, after electrofusion there is always a leaktight electrofusion zone between the metal weld and the two free ends of the heater wire leading to the inner surface of the sleeve. That embodiment requires the sleeve to be machined and the heater wire to be laid in a manner that is relatively more elaborate and difficult to perform.

SUMMARY OF THE INVENTION

An object of the present invention is to provide an improved new way of assembling together two steel pipe elements coated with internal lining, and to do so with the help of a tubular junction sleeve, which method is simultaneously mechanically more reliable in terms of sealing while also being simple and inexpensive to perform, in particular when assembly is performed on site on board a ship at sea, using pipe elements of short length suitable for laying from a ship at sea.

Another object of the present invention is to provide a method and a device for lining and assembling pipe elements that require a minimum number of parts for connecting together the non-fined ends of the pipe elements for assembly and that do not require the use of special tooling, such as clamping tools, during assembly of two lined pipe elements, and that do not require expensive elements made of corrosion-resistant steel.

Another object of the present invention is to provide an improved device and method for lining and assembling together pipe elements for use in making pipes suitable for being laid in great depths, and still more particularly pipes that are suitable for being used for injecting water, and in particular for injecting sea water.

To do this, the present invention provides a tubular junction sleeve of thermoplastic material suitable for being inserted inside a pipe comprising at least two steel pipe elements that are internally lined with a thermoplastic material where the ends of the two welded together pipe elements are assembled end to end, said sleeve presenting at each end a tubular wall terminal portion of thickness that is smaller than the thickness of the adjacent running portion of the tubular wall of said sleeve, said sleeve presenting, at at least one of said terminal portions of the sleeve, and preferably at each of them, at said zones of leaktight contact with the terminal portions of said linings, a said Joule effect heater wire arranged in a spiral at the outer surface of each said terminal portion of said sleeve, the sleeve being characterised in that said heater wire is folded in half so as to form a double spiral made up of two wire portions arranged side by side forming two substantially equidistant spirals that are joined together at a common end constituted by a hairpin-bend, each spiral traveling along said outer surface of each terminal portion of the sleeve from the first end of the spiral closest to the inner surface of the tubular wall of said sleeve towards a second end of the spiral constituted by said common hairpin-bend end, said second end of the spiral being closer to the outer surface ox the running portion of the sleeve adjacent to said terminal portion of the sleeve, the two non-spiral-wound free ends of the two portions of the wire at said first ends of the two spirals preferably being at the inner surface of the sleeve, said two free ends of the two portions of the wire at said first ends of the double spiral including two electrical power supply terminals of said wire and thus being capable of being united side by side with a common electrical connector at the inner surface of the sleeve.

Said tubular junction sleeve is suitable for being inserted inside the pipe at the abutting ends of the two pipe elements in such a manner that the terminal portions at the ends of said sleeve are at least in part in leaktight contact with the respective terminal portions at the ends of said internal linings of the two pipe elements. And said Joule effect heater wire is suitable for heating to create a said zone of leaktight contact by fusing together the materials constituting at least a portion of each of said terminal portions of the sleeve and each of said respective terminal portions of said linings in contact therewith and having said heater wires passing therethrough.

The present invention thus also provides a pipe comprising at least two steel pipe elements internally lined with thermoplastic material and assembled end to end, the ends of the two pipe elements being welded together, wherein a said tubular junction sleeve of the invention is interposed inside the pipe at the abutting ends of the two pipe elements so that the terminal portions at the ends of said sleeve are at least in part in leaktight contact with the respective terminal portions at the ends of said internal linings of the two pipe elements, and said leaktight contact zone being a fusion-welding zone between the materials constituting each of said terminal portions of the sleeve carrying said heater wire and each of said respective terminal portions of said lining in contact therewith.

The terms "inner" and "outer" are used herein respectively to designate inside and outside the pipe, the sleeve, or the lining, as appropriate.

The term "running portion of the sleeve" is used herein to mean the central portion of the sleeve situated between the two terminal portions at the two longitudinal ends of the sleeve.

As explained below, said terminal portions of the sleeve and of the lining may be in mutual contact via outer surfaces of revolution of said terminal portions of the sleeve coming into contact with inner surfaces of revolution of said linings, or via plane annular surfaces at the frontal ends of right section of said terminal portions of the sleeve and of said lining. Said surfaces of revolution of said terminal portions of the sleeve and of the lining present the same axis of revolution as said pipe.

Said zone of leaktight contact extends all around the mutually-contacting outer surfaces of revolution of said terminal portions of the sleeve and inner surfaces of revolution of said terminal portions of the lining, i.e. over 360° around their axis of revolution XX'. In contrast, said zone of leaktight contact may extend over only a portion of the lengths in the axial direction of said surfaces of revolution of the terminal portions of the sleeve and of the lining that are in mutual contact.

It can be understood that said surfaces of revolution of said terminal portions of the sleeve and of the lining present the same axis of revolution as said pipe and as said sleeve when in position inside said pipe.

In known manner, each said pipe element has internal lining made of plastics material, preferably of thermoplastic material, that terminates at a certain distance L from the end of said pipe element, and preferably at least a portion of the outer surface of each terminal portion at the ends of said internal lining is held by adhesive against the corresponding inner surface of the steel wall of the pipe using an adhesive that is preferably of the epoxy or polyurethane type.

Also in known manner, the sleeve extends in a longitudinal axial direction XX' of the pipe over a length covering at least the lengths of pipe that are not covered by said linings, i.e. at least twice said distance L.

In its inner surface, such a lined pipe does not present any discontinuity of material at the coupling between two successive pipe elements. It can be understood that said fusion zone is obtained by electrically powering said Joule effect heater wire interposed in the interface between said contacting surfaces of the terminal portions of the sleeve and of the lining. Said fusion-welding zone (referred to below as "fusion zone" for short) is thus performed in this example by the so-called "electrofusion" method that makes it possible to provide a zone of leaktight contact that is particularly reliable and strong and that is also particularly easy to implement in the context of its application in accordance with the invention to joining together said sleeves and pipe linings.

It can be understood that the Joule effect double spiral heater wire needs to extend over the surface of said sleeve without any crossings so as to avoid electrical short circuits.

It can be understood that the outer surface of the running portion of the sleeve adjacent to said terminal portion of the sleeve is situated facing portions of the inner walls at the ends of said assembled-together pipe elements that are not covered by said lining.

In the present invention, a heater wire wound in a double spiral as defined above is used with the two free (non-spiral-wound) ends of the wire being situated on the same side of the double spiral so as to be able to reach the inner surface of the sleeve as close as possible to said inner surface. Thus, when the wire is used on an outer surface of revolution as defined below, it is possible to use a heater wire having its two free ends situated on the same side of the electrofusion zone, i.e. the side remote from said metal weld. Thus, a fluid under pressure cannot access said metal weld by passing through the thickness of the sleeve to the fusion zone, but can only pass in the interface between the leaktight contact zone or fusion zone and the inside of the pipe.

The implementation of the present invention with a heater wire wound in a double spiral is advantageous in that it makes it possible to ensure sealing that is more complete and more reliable for the contact surface between said terminal portions of the sleeve and of the lining so as to avoid any risk of said weld coming into contact with water when said pipe conveys water and thus avoid any risk of the zone situated between the outer surface of the sleeve and the inner surface of said pipe elements being invaded, which would inevitably constrict the inside diameter of the sleeve, i.e. reduce its section for passing fluid flow, thereby giving rise to disturbances in the flow of fluid inside the sleeve, without mentioning the risk of said weld coming into contact with water, when said pipe is used to convey water.

Because the two non-spiral-wound free ends of the wire start from the same end of the double spiral beside the non-sealed portion of the interface leading solely to the inner surface of the sleeve, a fluid under pressure cannot pass through the thickness of the sleeve to the second end and therefore cannot gain access to said weld, but can only pass into the interface and into the channels for the ends of the wire between said first ends of the double spiral and the inside of the pipe.

The sealing solution of the present invention is simple and less expensive to implement than the implementation of documents WO 2010/041016 and EP 0 722 824, and above all it presents the following additional advantages.

One advantage of this double-spiral implementation in which both free ends of the wire extend from cue same side of the fusion zone, is thus that when the two spirals are electrically powered in order to perform the electrofusion, they induce magnetic fields in opposite directions so that the resultant field is zero, thus making it possible to avoid disturbing the supply of electricity to the heater wire while performing electrofusion and thus making it possible for electrofusion to be more uniform and more regular throughout the zone.

Another advantage of the implementation in which the two ends of the spiral extend from the same side of said fusion zone is that it is possible to use a sleeve referred to herein as a "constricted sleeve", i.e. a sleeve that initially presents, at least in a central portion, a smaller outside diameter that is less than the outside diameters of its running portions adjacent to said central portion so as to leave an annular gap in which it is possible to place an annular part for thermally protecting the sleeve while welding together the ends of the pipe elements, as explained below, said running portions of the sleeve preferably presenting an outside diameter that is slightly less than the inside diameter of the ends of the assembled-together pipe elements that are not covered in said lining.

Said sleeve may be prefabricated with a said heater wire already applied to its surface, which is easier to perform than applying a heater wire in situ inside said pipe elements on the surfaces of said internal linings of the in situ pipe element inside the pipe before inserting said sleeve inside said pipe element.

In another implementation, the heater wire is not applied as a spiral, i.e. it is not made as a plurality of turns arranged in succession in the direction of their axis of revolution in order to cover said fusion zone, but said wire makes at least one turn around said axis of revolution around the fusion zone while performing a plurality of go-and-return paths between the two ends of said fusion zone in the axial direction of the axis of revolution of said fusion zone, as shown in FIG. 2B.

The fact that said heater wire preferably presents terminals at its ends available in the inner surface of said sleeve is advantageous in that it makes it easier to supply electricity to the wire from inside the pipe during assembly of the pipe, as explained below.

It can be understood that the terminal portions at the ends of the sleeve present surfaces of shapes that are identical or complementary to the surfaces of the terminal portions at the ends of said linings with which they are in contact.

In a first variant implementation, the wall of the sleeve at at least one of said terminal portions of the sleeve is of substantially the same thickness as the thickness of the adjacent running portion of the sleeve facing the non-lined pipe, and of substantially the same thickness as the thickness of a said terminal portion of said lining and as the thickness of the adjacent running portion of said lining, said fusion-welding zone being situated at the right frontal ends of the sleeve and of said lining in abutment against each other.

It can be understood that said right frontal ends form annular plane surfaces extending in a direction perpendicular to the longitudinal direction XX' of the sleeve and of the pipe and that they are constituted by the edge faces in right cross-section of said ends.

In this implementation, the spiral formed by the heater wire is plane and it progresses around said frontal surface or edge race at the end of the sleeve in such a manner that the diameters of its concentric turns that are all situated in the same plane increase going from said first end that is closest to the inner surface of the sleeve towards its said second end that is closest to the adjacent outer surface of the sleeve situated facing the inner wall of the pipe.

For a heater wire in the form of a double spiral, said first ends of the two spirals are arranged on the same side of said fusion zone, i.e. they lead to the inner surface of said sleeve.

The first variant implementation with right frontal ends as described above is particularly advantageous when the thickness of said linings and said sleeves in the running portion is of greater value, in particular greater than 10 mm.

In a second variant implementation that is more particularly advantageous for small thicknesses, in particular thicknesses of less than 10 mm, said internal lining presents, at at least one end, a terminal portion of thickness that is smaller than the thickness of the running portion of said lining, defining a concave shape with an inner surface of revolution of inside diameter that is greater than the inside diameter of the running portion of said lining, and said sleeve presents, at at least one end, a terminal portion of thickness that is smaller than the thickness of the adjacent running portion of said sleeve, said terminal portion of the sleeve defining a convex shape suitable for extending over the concave terminal portion of smaller thickness of said lining with which it is in contact, said terminal portion of the sleeve defining an outer surface of revolution of outside diameter that is less than the outside diameter of the adjacent running portion of the sleeve and a cylindrical inner surface of substantially the same inside diameter as the inside diameter of said running portion of the lining and of said running portion of the sleeve, said Joule-effect heater wire running over the entire periphery of said outer surface of revolution around its axis of revolution (XX') and over at least a fraction of the length of said terminal portion in the direction of said axis of revolution (XX').

Thus, when said heater wire runs over an outer-surface of revolution, said two free ends at said first ends of the two spirals of the double spiral are preferably situated on the side closest to the closest end of the sleeve, i.e. the end of the sleeve corresponding to said terminal portion having its outer surface of revolution covered by said heater wire.

More particularly, said pipe is characterized in that said two free ends of said heater wire are situated on the side of said fusion zone that is closest to the nearest end of the sleeve.

By virtue of their complementary shapes, it can be understood that said terminal portion of the sleeve and said terminal portion of smaller thickness of the lining enable the sleeve to be inserted against the inner surface of the terminal portion of smaller thickness of the lining merely by engaging said sleeve by force in the axial longitudinal direction XX' inside said pipe element, and the outer surface of said terminal, portion of smaller thickness of the sleeve in contact with the inner surface of the terminal portion of smaller thickness of the lining present identical shapes and are arranged relative to each other so that their identical outlines match.

In a first sub-variant of the second variant, said inner surface of the smaller-thickness terminal portion of the lining and said outer surface of the smaller-thickness terminal portion of the sleeve covered in said heater wire that are in contact with each other have the same frustoconical shape about the common axis XX' of said sleeve and said pipe.

It can be understood that by their respective complementary concave and convex shapes, said frustoconical inner and outer surfaces present respective angles at the apex of substantially the same value. In this implementation with a frustoconical contact surface, said smaller-thickness terminal portions of the sleeve and of the lining that are in contact present a thickness that increases going from the ends of the sleeve and the lining respectively towards the adjacent running portions of the sleeve and of the lining respectively, and the spiral or double spiral of the heater wire advances with turns of increasing diameter from its said first end situated beside the smaller-thickness terminal portion of the sleeve towards its said second end situated beside the greater-thickness terminal portion of the sleeve.

In this implementation, said first ends of the two spirals are arranged on the same side of said fusion zone in the axial direction of revolution XX' of said spirals.

In a second sub-variant of this second variant, said inner surface of the smaller-thickness terminal portion of the lining and said outer surface of the smaller-thickness terminal portion of the sleeve that are in contact with each other have the same cylindrical shape about the common axis XX' of said sleeve and said pipe, and preferably the end of the smaller-thickness terminal portion of the sleeve that is covered in said heater wire comes info abutment against a shoulder defining the inner surfaces of said running portion and of said smaller-thickness terminal portion of the lining.

In this embodiment with a cylindrical contact surface, said contacting smaller-thickness terminal portions of the sleeve and of the lining present respective thicknesses that are preferably identical and substantially constant, and the double spiral of the heater wire progresses with turns of constant diameter from its said first end situated beside the smaller-thickness terminal portion of the sleeve towards its said second and situated beside the greater-thickness terminal portion of the sleeve.

When the inner surface of the smaller-thickness terminal portion of the sleeve is conical or cylindrical, the double spiral formed by the heater wire is three-dimensional, i.e. of a helical shape since its turns are spaced apart in the longitudinal direction of the sleeve.

In all three of the above implementations having contacting surfaces of the terminal portions of the sleeve and of the liner that are frontal, conical, or spherical, the contact surface presents a topology of the cone type with the half angle at the apex $\alpha$ lying between $0°$ and $90°$ for surfaces that are conical, and of the type having a fictitious cone with a half angle at the apex $\alpha=90°$ for frontal ends of right section, and $\alpha=0°$ for surfaces that are so little, such that in all circumstances said first end of the spiral is situated beside the apex of the cone or of the fictitious cone.

More particularly, the pipe is a connection pipe, either a pipe resting on the sea bottom, or a bottom-to-surface connection pipe suitable for being laid in sea of great depth, preferably up to 3000 m, and said pipe elements present a length lying in the range 20 m to 50 m, of inside diameter lying in the range 10 centimeters (cm) to 60 cm, and said sleeve presents a length lying in the range 45 cm to 150 cm. More particularly, the pipe is a pipe for injecting water under pressure into wells in an oilfield, which pressure is always greater than 5 MPa and more particularly lies in the range 25 MPa to 70 MPa (250 bars to 700 bars). As mentioned above, this type of pipe is particularly stressed at said welds, so it needs to be protected as much as possible against any corrosion due to contact with seawater, in particular for bottom-to-surface connections since under such circumstances the pipe is perpetually in movement as a result of the effects of swell, wind, and current acting on the floating support at the surface, thereby subjecting the pipe to extreme levels of fatigue stress.

In another advantageous aspect of the present invention, said sleeve is made by assembling together by fusion welding, preferably by electrofusion, surfaces at the mutually-contacting ends of at least two tubular portions of said sleeve comprising at least:
  a first tubular sleeve portion having a running sleeve portion and a central sleeve portion, the central sleeve portion being of outside diameter and preferably also of inside diameter that are of dimension(s) smaller than the outside diameter, and preferably also respectively the inside diameter, of the adjacent running portion, more preferably said first tubular sleeve portion being obtained by machining a tubular sleeve of greater thickness; and
  at least one second tubular sleeve portion having a terminal tubular sleeve portion preferably presenting a length that is shorter than said first tubular portion in the axial direction XX' of the sleeve, and preferably presenting a cylindrical inside surface, and more preferably said second sleeve portion being obtained by molding; and
  the ends of said first and second assembled together tubular sleeve portions presenting shapes that are identical or complementary in their contact zone, with at least one of said surfaces being covered by a said Joule effect heater wire wound in a double spiral, and having its end terminals more preferably leading to the inside surface of said tubular sleeve portion.

This implementation comprising a plurality of tubular sleeve portions is advantageous, since it makes it possible to limit the provision of molded pares two parts that are of relatively small size, thereby avoiding any need to use molds of large size which are very expensive.

As with the terminal portions of the sleeve and of the lining, said complementary concave and convex shapes of the two tubular sleeve portions that are assembled together by electrofusion may present identical surfaces having shapes that are:
  conical, or cylindrical for the ends of said smaller-thickness tubular sleeve portions; or
  plane annular surfaces, said to be "frontal" surfaces, the tubular sleeve portions being assembled together via their edge faces that lie in a plane perpendicular to said longitudinal direction XX' of the sleeve.

Preferably, said sleeve is constituted by assembling together by electrofusion welding a said first tubular sleeve portion that is assembled to each end of a said second tubular sleeve portion, each said second tubular sleeve portion having a free end including a said terminal sleeve portion.

In an implementation in which assembly is mechanically particularly reliable, said first and second tubular sleeve portions present, at their assembled-together ends, respective concave and convex complementary shapes, the conical inner surface of said first tubular sleeve portion or said conical outer surface of said second tubular sleeve portion being covered in a said spiral-wound heater wire. This implementation is more particularly advantageous, and for performing said assembly by electrofusion of said first and second tubular end portions in situ by initially inserting said second tubular sleeve portion that is assembled by electrofusion with a terminal portion of an internal lining of a pipe element, and then assembling said first tubular sleeve portion and said second tubular sleeve portion with each other. Under such circumstances, the chamfered end for assembly of said first tubular sleeve portion engages like a wedge in the sharp angular gap, with the concave conical inner surface wedged in abutment against the conical convex outer surface of the end of said second tubular sleeve portion.

The present invention also provides a method of making a pipe of the invention, the method comprising the following steps:
  1) assembling together pipe elements including a said lining with a terminal portion of smaller thickness at each end, and a said tubular junction sleeve inserted into only one end of each said pipe element and projecting therefrom, the projecting sleeve defining a male end for each pipe element suitable for being assembled with an end not having a said sleeve and defining a female end of another said pipe element by axially engaging and forcing in the longitudinal direction (XX') said female end not having a tubular junction sleeve of a pipe element for assembly around the male end having a tubular junction sleeve fastened thereto that projects from the terminal pipe element of a pipe that is being assembled, until said terminal portion of the sleeve of said male end of said terminal pipe element is in contact with said terminal portion of the lining of said female end of said pipe element for assembly, each said sleeve including on each of said terminal portions of the sleeve a said Joule effect heater wire wound in a datable spiral, then 2) electrically powering said heater wire, preferably while simultaneously exerting pressure between said contacting sleeve terminal portion and said, lining terminal portion in order to provide a said zone for welding by electrofusion in at least a portion of the interface at the surfaces of each said sleeve terminal portion and each said lining terminal portion in mutual contact and having the heater wire double spiral running thereover at the surface of the sleeve in order to provide a said zone of leaktight contact by fusion; and 3) welding together the ends of the two abutting pipe elements.

Preferably, in a central portion, said sleeve presents an outside diameter that is less than the outside diameters of the running portions adjacent to said central portion so as to leave an annular space between the sleeve and the wail of said pipe elements, and an annular thermal protection part is placed therein suitable for protecting the sleeve while the ends of the pipe elements are being welded together, said running portions of the sleeve preferably presenting an outside diameter chat is substantially identical to the inside diameter of the ends of the assembled-together pipe elements that are not covered by said lining.

This implementation is particularly advantageous in that it makes it possible to create an annular gap of sufficient size for receiving a said annular part for thermally protecting the sleeve, thereby preventing the sleeve being damaged while welding together the steel ends of said pipe elements for assembly, thereby protecting the outer surface of the sleeve facing said ends of the pipe elements that are to be welded together.

Also preferably, the tubular wall of said sleeve presents thickness that is substantially constant in its said adjacent running portions and substantially equal to the thickness of the running portion of said internal lining, and said central portion of the sleeve, which is preferably of smaller thickness, is suitable for deforming so as to adopt an inside diameter that is substantially identical to the inside diameter of the remainder of the sleeve under the effect of an internal pressure of at least 1 MPa of the fluid that flows inside the pipe in operation, and the thermal, protection part is itself also deformable under the same pressure conditions preferably so as to adopt a thickness of less than 5 mm, and more preferably of less than 2 mm, said thermal protection part more preferably being constituted by ceramic fibers.

Also preferably, said pressure is exerted against the inner surface of the sleeve at its said terminal portion by inserting a device comprising an inflatable ceil inside the sleeve, said cell initially being at least partially deflated, and preferably including or co-operating at its surface with an electrical power supply connector that is positioned in such a manner that said electrical connector of the cell can co-operate, when said cell is inflated, with the electrical connector on the inner surface of the sleeve and including the terminals of the heater wire, and then inflating said cell.

The present invention also provides a pipe element for use in a method of the invention for making a pipe, said pipe element including a said plastics lining with a terminal portion of smaller thickness terminating at a certain distance from each end of said pipe element, and a said tubular junction sleeve of thermoplastic material, having one end inserted in one of the ends of the pipe element and having its other end projecting from the pipe element, a terminal portion of the end of said sleeve inserted in said pipe element being at least in part in leaktight contact with a terminal portion of said internal lining at the end of the pipe element in which said sleeve is inserted, the pipe element being characterised in that the outer surface of said terminal portion of the sleeve that is in contact with said terminal portion of said internal lining, and the outer surface of the other terminal portion of the end of the sleeve that projects from said pipe element are each covered in a respective Joule-effect heater wire arranged in a double spiral so as to be able to create a said welding zone by the Joule-effect fusion at the interface between said terminal portions of the sleeve and respective terminal portions of said linings of pipe elements that are in contact or that are to be put into contact with each other.

Methods of making internal lining elements for pipe elements, and methods of assembling pipe elements including internal lining with the help of a tubular sleeve are described in WO 2006/042925, and can be applied in the present invention; in particular it is possible to make the internal lining using a method comprising she following steps:

1) inserting, via a first end of a pipe element, a pipe made of flexible and elastic thermoplastic material and in the shape of a pipe of circular section or of section folded info the shape of a kidney bean, in order to constitute said liner, and pulling it inside said pipe element up to the second end of the pipe element, and then releasing traction so as to enable it to expand radially and press against the inner surface of the wall of said pipe element; and 2) cutting and machining the ends of said lining pipe so as to form said terminal portions of smaller thickness of said internal liner and a non-lined terminal portion of the steel wall of said pipe element at each of its two ends.

The method comprises the following more particular characteristics:

coating the outer surface of the thermoplastic lining pipe in an adhesive, at least in a zone situated on the outside of said pipe element, at least beside said first end of said pipe element after the traction has been released and said lining pipe has shrunk fully, close to or as the terminal portions of smaller thickness of the lining;

coating the outer surface of the thermoplastic lining pipe in an adhesive in two zones situated outside said pipe element, respectively both sides of said first and second ends of said pipe element, for the purpose of being positioned after traction has been released and after said lining pipe has shrunk completely, close to or at each of said terminal portions of smaller thickness of the lining;

before step 1), coating the inner surface of said second end of the pipe element in an adhesive in a first zone that is to face a corresponding first zone of said corresponding lining close to or at said terminal portion of smaller thickness of the lining after machining, and coating the outer surface of the thermoplastic lining pipe in an adhesive close to or at a second zone of said lining that is to form said terminal portion of smaller thickness of the lining beside said first end of said pipe element after machining;

with the help of a device situated outside said pipe element, performing cold plasma treatment on the zones of the outer surfaces of the thermoplastic lining pipe that are to be adhesively bonded or that are to be pressed against an adhesively-coated zone of the steel wall of a said pipe element, in order to improve the effectiveness of the adhesive bonding;

performing cold plasma treatment on the outer surface of the thermoplastic lining pipe at a said first sons of said flexible lining pipe that is to be adhesively bonded to a said first adhesive-covered zone 4b of the inner surface of the steel wall of said second end of said pipe element, and also at a second zone of the outer surface of said flexible lining pipe that is subsequently to be adhesively bonded, said plasma treatment being performed before said flexible lining pipe is inserted inside said pipe element; and performing said plasma treatment at said first sons of said flexible lining pipe over a length that is greater than the sum of the shrunk length of said flexible pipe after releasing traction on said lining pipe plus the length of said first adhesively-coated zone of the inner surface of the steel wail at said second end of the pipe element, so that said first zones overlap over their entire length from the release of traction until said lining pipe has shrunk fully after said traction is released.

To do this, it can be understood that it is possible to release the traction on said lining pipe when the rear end of said first cone of said lining pipe comes up to said first adhesive-coated zone of the steel wall at the second end of the pipe element. After traction has been released, the front of said first zone of the lining pipe comes up to said first adhesive-coated zone of the pipe element.

Preferably, prior to step 1), said thermoplastic lining pipe is heated in order to make it easier to stretch to a smaller diameter, preferably by passing it through a die.

It can be understood, that said pipe of flexible material, prior to heating and having traction applied thereto, presents at rest an outside diameter that is greater than the inside diameter of the pipe element, and that it is inserted and stretched by heating and traction in a form that presents a substantially circular section of smaller diameter.

BRIEF DESCRIPTION OF THE DRAWINGS

Other characteristics and advantages of the present invention appear in the light of the following detailed description with reference to the following figures, in which:

FIG. 2 is a side view in section of a steel pipe fitted with an inner lining machined as a female cylinder of axis XX' of inside radius R and receiving a tubular sleeve of FIG. 1D machined as a male cylinder of axis XX' and of outside radius that is substantially identical to R;

FIG. 2A is a perspective view of a first way of providing electric heating using a resistor wire in a double spiral in a cylindrical zone for assembly by fusion between the tubular sleeve and the inner lining of the FIG. 2 pipe;

FIG. 2B is a perspective view of a variant embodiment of a heater wire running over the cylindrical outer surface of a terminal portion of a tubular sleeve and arranged other than in a spiral;

FIGS. 4A and 4B are longitudinal section views of a zone 4-1 of welding by fusion ("fusion zone") implemented with the help of a heater wire arranged as a double spiral as shown in FIG. 3A (FIG. 4A) or as a single spiral as shown in FIG. 4B (FIG. 4B);

FIGS. 5A and 5B are similar longitudinal section views of the fusion zone 4-1 when assembling right frontal ends of the sleeve and of the inner lining with a plane concentric double spiral (FIG. 5A) and with a plane concentric single spiral (FIG. 5B);

FIG. 6A is a side view in section of a steel pipe fitted with an inner sleeve cut flush with said pipe;

FIG. 6B shows the machining of the conical portion of the lining at a distance $L_1$ from the end of said pipe;

FIG. 7 is an exploded side view of a steel pipe string fitted with an inner lining that is machined at each of its ends in the manner shown in detail with reference to FIG. 6B;

FIG. 8 is a side view in section of a tubular junction sleeve obtained by assembling a central part machined from a thick-walled tube, having a conical type left end and a plane type right end;

FIG. 8A shows a variant embodiment of a tubular sleeve obtained by assembling a central part 10-1 having a left end of concave conical shape suitable for being assembled with the convex conical end of a second tubular sleeve portion 10-2 whose other end is of the right frontal type, assembled to a lining 2 that likewise has a right frontal end;

FIG. 9A is a side view of an installation, ship fitted with a so-called "J-lay" tower;

FIGS. 9B, 9C, and 9D are side views in section of stages in the assembly of two successive lengths of lined pipes, respectively in a stage of welding by electrofusion a tubular junction sleeve to the lower lining, then a stage of approaching the upper string for assembly (FIG. 9B) and then a stage of welding the steel pipe (FIG. 9C), and finally a stage of welding by electrofusion said tubular sleeve to the lining of the upper string (FIG. 9D); and FIG. 9E is a side view in axial section of an expandable mandrel fitted with a movable portion of an electrical connector suitable for performing the welding by electrofusion of the sleeve and the lining shown in FIG. 3D.

DETAILED DESCRIPTION OF THE PRESENTLY PREFERRED EMBODIMENTS

Figure 1:
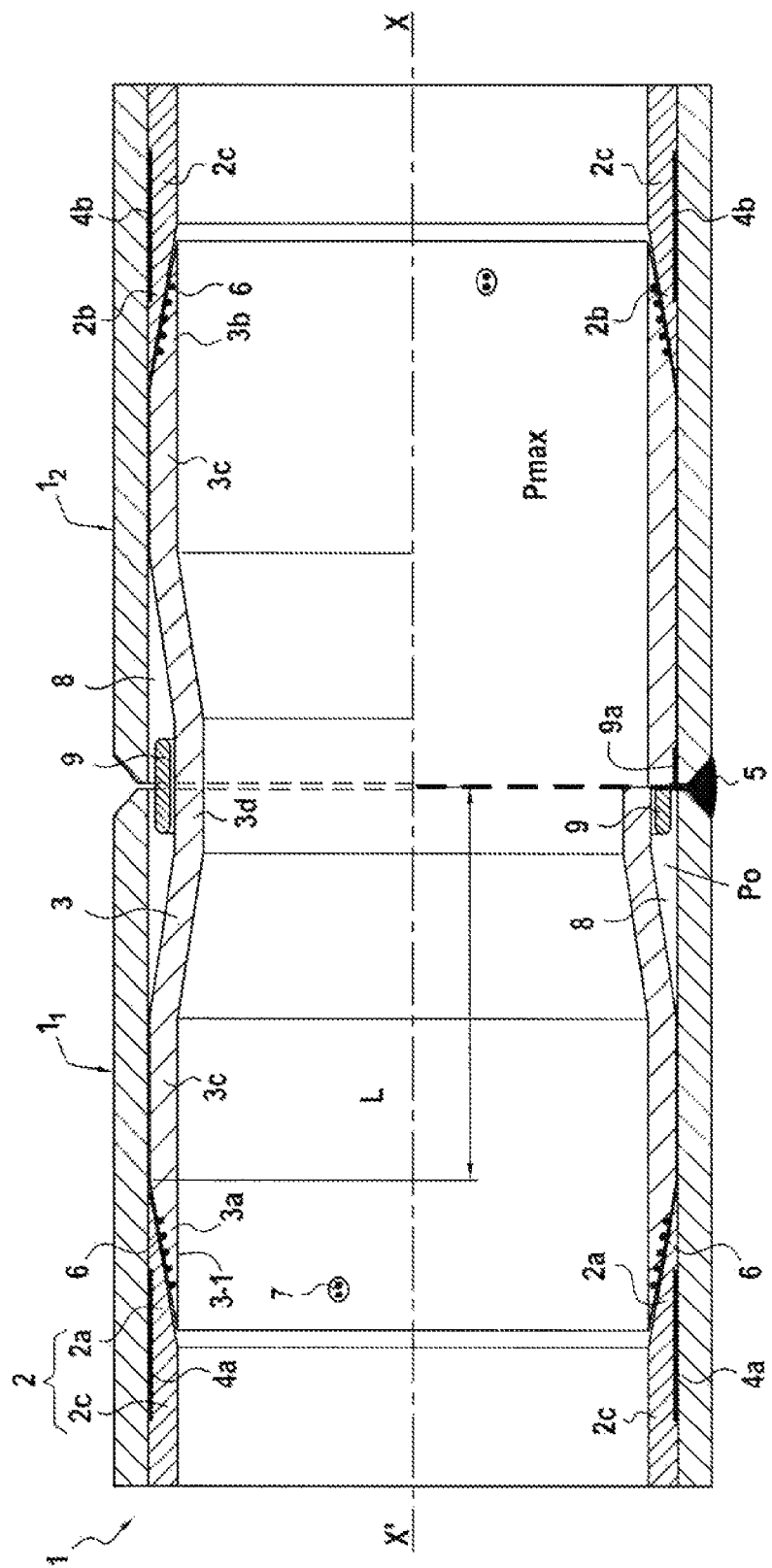
FIG. 1 is a side view in section of a pipe of the invention assembled with the help of a tubular junction sleeve between two lined pipe elements or unit pipe lengths of the invention.

FIG. 1 shows a pipe 1 of the invention comprising at least two pipe elements $1_1$ and $1_2$ with internal, lining 2 of polyethylene or polypropylene, the elements being assembled together end to end, and the ends of the two pipe elements being joined together by a weld 5. Each pipe element has an internal lining of thermoplastic material 2 of axis XX' that coincides substantially with, the axis of the pipe elements $1_1$, $1_2$, the linings presenting at each end respective conical terminal portions 2a, 2b of angle at the apex α that are of thickness that is smaller than the thickness of the running portion 2c of said lining, thereby defining an internal surface of revolution of inside diameter that is greater than the inside diameter of the running portion 2c of said lining and terminating at a certain, distance L from each end of said pips element. The outer surface of each said terminal portion 2a, 2b of the internal lining is preferably held by adhesive 4a, 4b holding the end of the lining at or close to said terminal portion 2a, 2b of smaller thickness of the lining against the corresponding inner surface of the steel wall of the pipe, the adhesive preferably being of the two component epoxy or polymethane type.

A tubular junction sleeve 3 of thermoplastic material, preferably identical to the thermoplastic material of the internal lining 2, and of axis XX' coinciding substantially with the axis of the pipe elements $1_1$, $1_2$ of the same outside diameter that is slightly smaller than the inside diameter of the pipe is inserted inside each of the abutting ends of the two pipe elements so as to extend over said terminal portions of the two linings 2a, 2b.

More precisely, in FIG. 1, the internal lining 2 presents at each end of a pipe element a terminal portion 2a, 2b of thickness that is smaller than the thickness of the running portion 2c of said lining so as to define a concave shape with a frustoconical inner surface with an angle at the apex α, of inside diameter that, is greater than the inside diameter of the running portion 2c of said lining, and said sleeve 3 presents, at each of its longitudinal ends, a respective terminal portion 3a, 3b of thickness that is smaller than the thickness of the adjacent running portion 3c of said sleeve, said terminal portion 3a, 3b of the sleeve defining a convex shape suitable for extending over the smaller-thickness terminal portion 2a, 2b of said lining with which it is in contact, said terminal portion 3a, 3b of the sleeve defining a frustoconical outer surface 3-2 of outside diameter that is smaller than the outside diameter of the adjacent running portion 3c of the sleeve, and having the same angle at the apex α as said frustoconical inner surface of said concave terminal portion of said lining. The conically-shaped terminal portions of the sleeve define a cylindrical inner surface 3-1 having substantially the same inside diameter as said running portion 2c of the lining and as said running portion 3c of the sleeve.

Figure 1A:
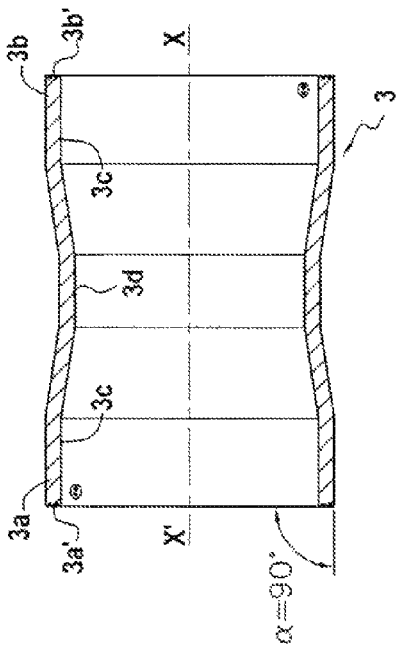
FIG. 1A is a side view in section of the tubular junction sleeve presenting two conical type ends incorporating first electric heater means using a resistor wire arranged in a helical spiral on the outer surface, of FIG. 1.

In FIG. 1A and in the left-hand portion of FIG. 1, the sleeve presents a central portion 3d, i.e. about halfway along the sleeve in its axial longitudinal direction XX', with an outside diameter that is smaller than the outside diameters of the running portions 3c adjacent to said central portion 3d so as to leave an annular space 8, and an annular thermal protection part 9 is placed therein for protecting the sleeve while welding together the ends of the pipe elements, said running portions 3c of the sleeve presenting an outside diameter that is substantially identical to the inside diameter of the uncovered ends of said lining of the assembled-together pipe elements.

The tubular wall of said sleeve presents thickness that is substantially constant in its central portion 3d and its adjacent running portions 3c, which thickness is substantially equal to the thickness of the running portion 2c of said internal lining 2, and said central portion 3d of the sleeve is suitable for deforming so as to adopt an inside diameter that is substantially identical to the inside diameter of the remainder of the sleeve under the effect of internal pressure from a fluid flowing inside the pipe in operation, which pressure is at least 1 MPa, and the thermal protection part 9 is itself also deferrable under the same conditions of internal pressure inside the pipe so as to adopt a small thickness, preferably a thickness of less than 5 mm and more preferably less than 2 mm, said thermal protect ion piece more preferably being constituted by ceramic fibers in a form similar to cotton wool.

It can be understood that:
  because of its substantially constant thickness, the central portion of the sleeve presents a constriction in outside diameter and in inside diameter during laying with the pipe being empty and at atmospheric pressure or when it is subjected to pressures corresponding to pressure values of less than 1 MPa (10 bars); and
  as soon as the inside pressure exceeds 1 MPa (10 bars), the thicknesses, in particular of about 5 mm to 20 mm, and the stiffness of the plastics material, such as polyethylene or polypropylene, enable the inside and outside diameters of the central portion to be increased by deformation, e.g. when a fluid, in particular water under pressure, flows inside the pipe and the sleeve, as occurs in water injection pipes for oil wells at a pressure greater than 5 MPa, and in particular lying in the range 25 MPa to 70 MPa.

In the top portion of FIG. 1, the ends of the two steel pipe elements are arranged face to face, ready to be welded together, whereas in the bottom portion of said figure, the two pipe elements are joined by welding 5. The tubular junction sleeve is shown in its left-hand portion in its initial configuration, i.e. in its configuration when the pressure inside the pipe and the sleeve is substantially equal to atmospheric pressure or to an inside ambient pressure $P_0$ of less than 0.5 MPa to 1 MPa (5 bars to 10 bars). In contrast, in the bottom right-hand portion, the sleeve 3 is shown deformed under the effect of a pressure Pmax greater than 1 MPa or 2 MPa inside the pipe and the sleeve. The service pressure Pmax when delivered by the pressure of water that is being injected into particular wells of the oil field, is generally of the order of 25 MPa to 40 MPa (250 bars to 400 bars), but it may reach or exceed 70 MPa (700 bars).

Because the pressure $P_0$ outside the lining is much less than the internal pressure Pmax, this pressure has the effect of firmly pressing the constricted central portion 3d of the tabular junction sleeve 3 against the wall of the steel pipe, the ceramic fiber shield 9 being likewise flattened and then presenting a residual thickness of no more than 1 mm to 2 mm.

The sleeve 3 presents a central portion 3d of constricted outside diameter that becomes pressed against the inside of the pipe as soon as the internal pressure exceeds 1 MPa to 1.5 MPa (10 bars to 15 bars) because of the flexibility of the thermoplastic material. To improve the deformability of this central portion 3d and of the adjacent transition zones, the thickness of these zones is advantageously smaller than the thickness of the running portion 3c of the sleeve by a proportion lying in the range 5% to 50%. Likewise, the central zone 3d and the transition zones, which are shown for clarity in the drawings of having sharply angled connections, are preferably connection fillets of large radius of curvature so as to avoid incipient cracks appearing in these zones.

Figure 3:
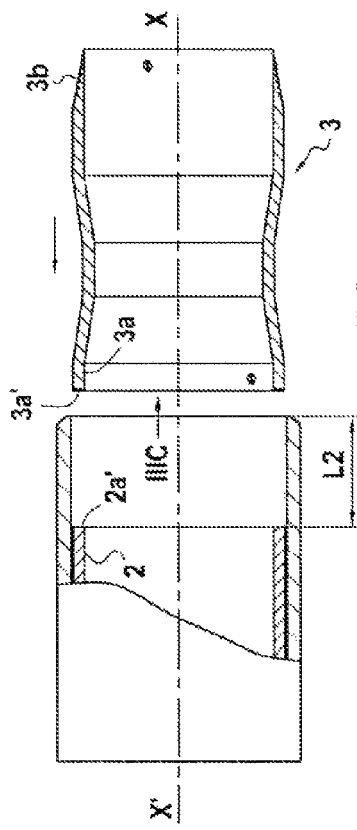
FIG. 3 is a side view in section of a steel pipe fitted with an inner lining machined in a plane perpendicular to the axis XX' at a distance $L_2$ from the end of said pipe and receiving a tubular sleeve in the configuration of FIG. 1C.
Figure 3C:
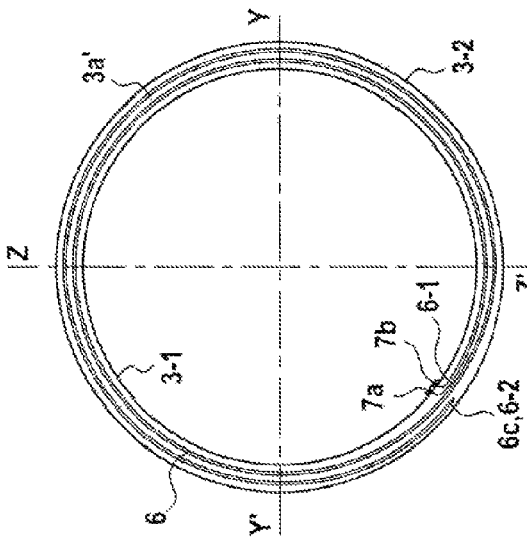
FIG. 3C is a view showing a detail of a second way of providing electric heating using a spiral-wound resistor wire with plane concentric turns at a right front end 3a', 3b' of a tubular sleeve of FIG. 1B, 1C, or 3.
Figure 3B:
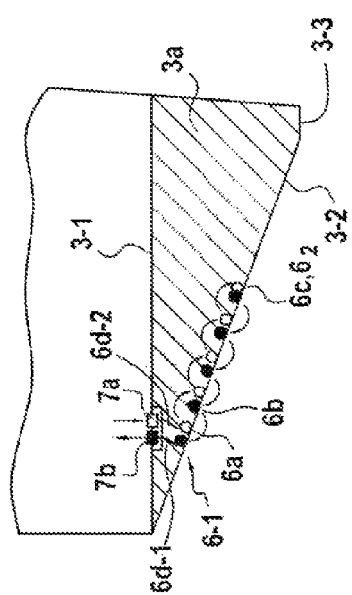
FIGS. 3A and 3B are longitudinal sections on a radial plane containing the axes XX' and A'A of FIG. 2A, showing the electrical connections of the resistor wires in two variants of the invention, respectively in a double spiral (FIG. 3A) and in a single spiral (FIG. 3B), but with firms of increasing diameter in order to cover a conical outer surface, of the terminal portion of the sleeve, as in FIGS. 1 and 1A.
Figure 3A:
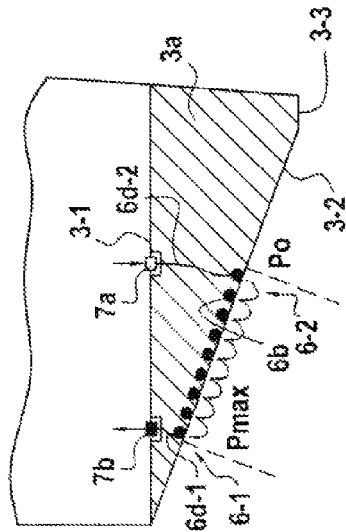

FIGS. 3A and 3B show two embodiments of an electric heater wire 6 arranged in a spiral on the outer surfaces 3-2 of the conical terminal portions 3a-3b of the sleeve of FIGS. 1 and 1A.

FIG. 2A shows a heater wire 6 folded in half at 6c so as to form a double spiral made up of two wire portions 6a, 6b arranged side by side, forming two substantially equidistant spirals that are joined at a common end constituted by a hairpin-bend 6c, each spiral traveling along said outer surface 3-2 of each said terminal portion of the sleeve from its spiral first end 6-1 closest to the end of the sleeve corresponding to said terminal portion, towards a second spiral end 6-2 consisting in said common bend 6c, said second spiral end 6-2, 6c being closer to the outer surface 3-3 of the running portion 3c of the sleeve adjacent to said terminal portion 3a, 3b of the sleeve, such that the two non-spiral-wound free ends 6d-1, 6d-2 of the two wire portions 6a, 6b have two electrical power supply terminals 7a, 7b for connecting said first ends 6-1 of the two spirals and arranged on the same side of said fusion zone 4-1 in the axial direction XX' around which said spirals turn, the two terminals 7a, 7b of said wire 6 thus being arranged side by side in a common electric connector 7 beside the inner surface 3-1 of the sleeve.

Figure 1B:
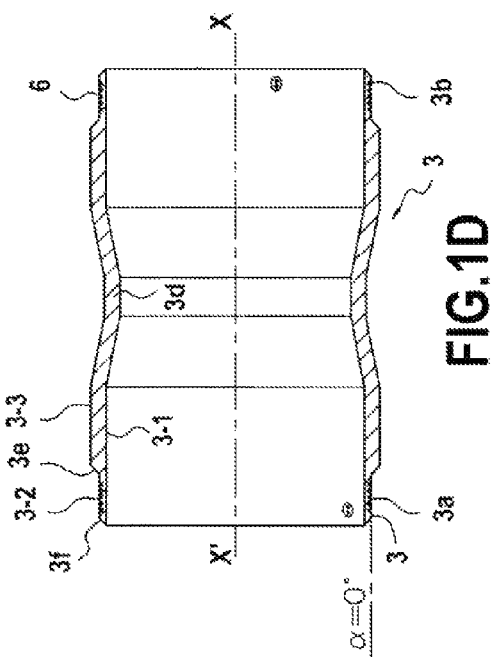
FIG. 1B is a side view in section of a tubular junction sleeve presenting two right front ends of the planar type incorporating second electric beater means using a resistor wire arranged in a plane spiral at each of the plane ends of the sleeve.
Figure 1C:
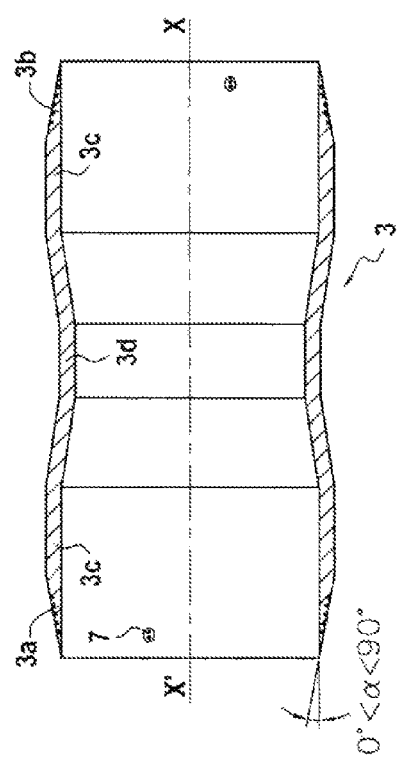
FIG. 1C is a side view in section of a tubular junction sleeve presenting a left end of the conical type incorporating first electric heater means and a right end of the plane type incorporating second electric heater means using a resistor wire.
Figure 1D:
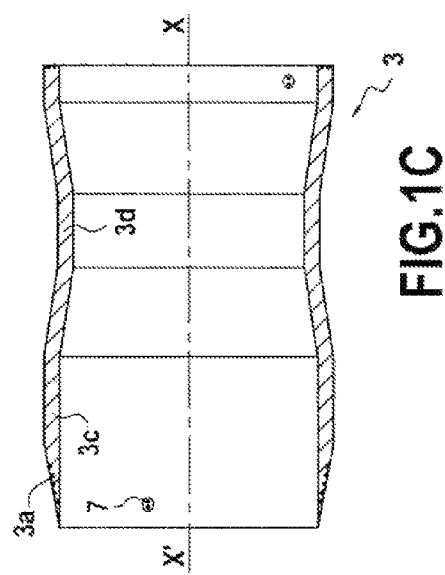
FIG. 1D is a side view in section of the tubular junction sleeve presenting two cylindrical type ends incorporating first electric heater means by resistor wire arranged in a helical spiral on the outer surface of each of the cylindrical ends of the sleeve.

In FIG. 2A, the double spiral has turns of substantially constant diameter, for covering a cylindrical outer surface of a sleeve terminal portion as in FIG. 1D.

In contrast, in FIG. 3A, the double spiral presents turns of diameter that increases in the axial direction XX' so as to be able to cover a portion of the conical outer surface 3-2 of the sleeve terminal portion 3a-3b.

In FIGS. 2A and 3A, electric current enters the wire at 7a, which wire is arranged in a rising conical spiral configuration 6a (shown in white in FIG. 3A) occupying several turns, e.g. ten turns, after which it reaches the end 6-2 folded in half as a hairpin-bend 6c, and thereafter returning in a descending conical spiral configuration 6b (shown in black in FIG. 3A) over the same number of turns so as to reach the outlet terminal 7b. The rising and descending spirals are wound with turns spaced apart a little, e.g. spaced apart by 1 mm, and they do not intersect, i.e. they do not interfere with one another. The terms "rising" and "descending" relate to the direction in which electricity flows along said wire.

In FIG. 3B, there can be seen a single-spiral variant installation for the heater wire. The wire is installed as a single descending spiral 6b. The wire starts at the terminal 7a of a first connector, follows its descending spiral and ends at the terminal 7b of a second connector. In this embodiment, the portion 6d of the wire connected to the connector 7a needs to pass through the thickness of the tubular junction sleeve and therefore runs the risk of putting the inside of the pipe, when subjected to a pressure Pmax, into communication with the outside of said sleeve where the pressure is $P_0$, i.e. substantially atmospheric pressure or a few bars, by seepage along said wire.

FIGS. 4A and 4B correspond to section views of fusion zones corresponding to sealed contact zones $4_1$ of the terminal portions of the sleeve and the lining in FIG. 1, with a double spiral as shown in FIG. 3A for FIG. 4A and a single spiral as shown in FIG. 3B for FIG. 4B.

FIGS. 4A and 4B make it possible to understand that in the single-spiral embodiment of FIGS. 3B and 4B, when the pipe is subjected to a service internal pressure Pmax, e.g. by a flow of water under pressure, the water can seep along the non-spiral-wound portion 6d-2 of wire providing the connection between the terminal 7a and the second end 6-2 of the spiral. In this embodiment, the portion 6d-2 of wire connected to the connector 7a passes through the thickness of the tubular junction sleeve and therefore runs the risk of putting the inside of the pipe that is subjected to the pressure Pmax into communication with the outside of said sleeve where there is a pressure $P_0$, i.e. substantially equal to atmospheric pressure or a few bars, by seeping along the wire. That is to say that water can reach the interface 4-3 of the conical contact surfaces of the terminal portions 3a, 2a of the sleeve and of the internal lining and can thus gain access of the annular chamber 8 and the space between the pipe and the sleeve, thus constituting a loss of sealing which it is desirable to avoid.

In contrast, at the opposite end of the fusion zone $4_1$ towards the interface 4-2 between the contacting surfaces of said terminal portions 3a, 2a of the sleeve and the lining leading to the inner surface 3-1 of the sleeve and to the inside of the pipe, the fact that water can seep along the non-spiral-wound end 6d-1 of wire between the first end 6-1 and the second terminal 7b and thus reach said interface 4-2 is not a problem since the essential point is that the fusion zone 4-1 prevents the water from reaching the interface 4-3 leading to the outside of the sleeve and thus to the welding zone 5.

In FIG. 4A, because the two ends 6d-1 and 6d-2 of the wire portions 6a-6b of the double spiral lead to the portion 4-2 of the interface 3 between the contacting surfaces of the sleeve and of the lining leading to the inner surface 3-1 and the inside of the pipe, the fusion sons 4-1 provides complete sealing, preventing any water from passing into the other portion 4-3 of said interface leading to the outside of the sleeve facing the outside wall 3-3 of the running portion of the sleeve.

Thus, the embodiment described with reference to FIGS. 3A and 4A constitutes the preferred embodiment of the invention. Furthermore, when alternating current (AC) is used for performing electrofusion, this embodiment has the advantage of not creating any significant magnetic field inside said tubular junction sleeve, and thus in the vicinity of the expandable mandrel 20 that is described below, given that the magnetic field created by the rising spiral is compensated by that created simultaneously by the descending spiral, so that the two fields substantially cancel. This constitutes a major advantage since the electrofusion process needs to take place quickly and consequently the injected current is of large magnitude.

FIG. 2B shows a variant embodiment of a heater wire 6 extending over a cylindrical or conical surface without crossing, the heater wire not being arranged in a spiral but being arranged as a single complete turn on the periphery 27 around the axis of revolution XX' in a series of back-and-forth paths between two ends in the axial direction XX' of said cylindrical or conical surface over which the wire passes as it goes around the periphery of said surface. However, this embodiment is more difficult to make by molding or by laying the wire in grooves machined in the outer surface of the terminal portions of the sleeve, as required.

In FIG. 1B, there can be seen a variant embodiment of a sleeve of the invention in which the terminal portions 3a-3b of the sleeve have the same thickness as the running portion 3c and as the central portion 3d of the sleeve and terminate in front ends of right section perpendicular to the axis XX'. Said front end 3a' in side view forms a plane annular surface shown in FIG. 3C as being covered in a double spiral with concentric turns having a first end 6-1 leading to the inside face 3-1 of the sleeve while the other end 6-2 of greater diameter corresponds to the hairpin-bend 6c of the double spiral and comes too close to the outer surface 3-2 of the sleeve. This type of right frontal end is for co-operating with a right frontal end of terminal portions 2a-2b of the internal lining, as shown in FIG. 3.

In the same manner as in FIGS. 4A and 4B, FIGS. 5A and 5B show that implementing a double spiral as in FIG. 5A is advantageous for avoiding the internal pressure Pmax inside the pipe and the sleeve reaching the outer surface of the sleeve 3-2 because of the risk of water flowing along the non-spiral-wound portion 6d-2 of the wire that provides the junction between the terminal 7a leading to the inner surface 3-1 of the sleeve and the second end 6-2 of the spiral giving access to the interface portion 4-3 leading to the outside of the sleeve. The presence of water at pressure Pmax at the outside of the sleeve, as a result of a loss of sealing, is damaging since it subjects the weld 5 to risks of corrosion and reduced ability to withstand fatigue, and that is harmful to the proper operation of the pipe throughout its lifetime, which may reach or exceed 25 years or even more.

In FIGS. 1D and 2, said inner surface of smaller thickness of the terminal portion 2a, 2b of the lining and of the outer surface of the smaller thickness terminal portion 3a, 3b of the sleeve, making contact with each other, have the same cylindrical shape about the same axis XX' as said sleeve and said pipe, the and of the smaller thickness terminal portion of the sleeve abutting against a shoulder 2e defining the inner surfaces of said running portion 2c and of said smaller thickness terminal portion 2a, 2b of the lining.

In this embodiment having a cylindrical contact surface, said sleeve is inserted against the smaller-thickness terminal, portion 2a-2b of the lining until the end 2f of the lining comes into abutment against a shoulder 3e defining said running portion 3c of the sleeve and said smaller thickness terminal portion 3a-3b of the sleeve, and/or said sleeve is inserted against the smaller-thickness terminal portion 2a-2b of the lining until the end 3f of the sleeve comes into abutment against the shoulder 2e defining the running portion 2c and said smaller-thickness terminal portion 2a-2b of the lining.

For reference, and as described in WO 2006/042925, the terminal portions of the lining are made at the end of the insertion process by "swagelining", and where appropriate by adhesive bonding, the lining then being cut flush with the steel pipe element, and then the machining is performed by a machine tool 12 installed on the face of the first end of the pipe element, as shown in FIGS. 6A and 6B. The machine tool 12 is constituted in known manner by a structure 12a, carrying drive means (not shown) serving to set a tool-carrier shaft 12c into rotation, with a device 12e causing the tool carrier to move along the direction XX', and a device 12f serving to move the machining tool 12d in the radial direction. The machine has centering means 12b that enable the axis XX' of said machine to be adjusted so as to coincide with the axis of the pipe element, thus making it possible to machine the inside of the lining at its ends in a manner that is accurately concentric with said steel pipe. For clarity in the drawings, in FIGS. 6A and 6B, the lining 2 is shown slightly spaced apart from the wail of the steel pipe element so as to reveal the approximate position, of the adhesively-bonded zone 4a relative to the zone of the machine smaller-thickness terminal portion 2a of said lining. In fact the lining and the wall are in intimate contact and the adhesive 4a spreads naturally over a large area, but a plasma-treated zone of the lining presents greater and known adhesion while the non-treated zones present practically no adhesion.

In FIG. 3, plane machining has been performed in similar manner perpendicular to the axis XX' and at a distance $L_2$ from the end of said pipe. In FIG. 2, cylindrical machining about the axis X'X and of radius R has been performed in similar manner over a length $L_3$ and at a distance $L_4$ from the end of said pipe.

Thus, there are several possible ways of assembling the internal linings and the tubular junction sleeves, each presenting an advantage depending on the thickness of the internal lining 2. The value of the angle α between the axis XX' and the generator line for the surface of the terminal portion 3a-3b of the sleeve in contact with the terminal portion 2a-2b of the lining may lie in the range 0 to 90°. For the embodiments of FIGS. 1, 1A, and 1C, showing a terminal portion 3a having a convex conical shape, the conical outer surface presents a half-angle at the apex α lying between 0 and 90°, with the apex of the cone being located on the left of the figure.

In FIG. 1B, there can be seen a so-called "frontal" shape: in fact this is a shape equivalent to the conical shape, but in which the angle α is equal to 90°.

FIG. 1D shows a cylindrical shape: in fact this is a shape equivalent to the conical shape, except that the angle at the apex: is 0°, with the apex of the imaginary cone then being at infinity.

With linings of small thickness, e.g. lying in the range 3 mm to 5 mm, it is advantageous to use the conical embodiment of FIGS. 1 and 1A with an angle α lying in the range 5° to 45°, and preferably 10° to 30°. For medium thicknesses, e.g. lying in the range 6 mm to 12 mm, it is advantageous to use the cylindrical embodiment of FIG. 1D. For large thicknesses, e.g. lying in the range 12 mm to 20 mm, it is advantageous to use the frontal mode with a right section as shown in FIG. 1B.

For prefabrication in a workshop, operating conditions are much simpler than on site, and furthermore there is not the hourly cost of operating the laying ship. It can therefore be advantageous to prepare the tubular junction sleeves and the strings using assembly technologies other than these used on site. For this purpose, FIG. 1C shows a tubular junction sleeve of mixed type possessing on the right an end of the frontal type for assembly in the workshop to the corresponding frontal end of an internal string lining as described with reference to FIG. 3.

FIG. 8 shows a variant of the FIG. 1C tubular junction sleeve that is obtained by assembling together three elements:
- a central element 10-1 obtained by machining a polyethylene tubular blank of large thickness (E) represented by chain-dotted lines;
- a first lateral element 10-2 fitted on the left, with the left-hand end thereof being of the conical type and the right-hand end of the frontal type, each of said ends including a heater wire; and
- a second lateral element 10-3 fitted on the right, each of its left and right ends being of the frontal type, each of said ends including a heater wire. The tubular junction sleeve 3 is then obtained in a workshop by electrofusing the first lateral element 10-2 onto the central element 10-1 and then by electrofusing the second lateral element 10-3 onto said central portion 10-1.

In this method, the central part 10-1 is machined so that its wall adopts a constant thickness e that is smaller and has an inside diameter that is constricted in its central portion 3d. Only the smaller-dimensioned lateral parts 10-2 and 10-3 are made by molding, for example, and then they are electrically welded to the central part.

The electrical welding to the central part may be performed using a heater wire of the spiral-wound type so as to cover the surface of one of the ends of said central element 10-1 or of said first lateral element 10-2 and of said second lateral element 10-3. Other means for performing fusion, e.g. using heater plates, could advantageously be used in a workshop.

In FIG. 8A, there can be seen an advantageous embodiment in which the junction between two tubular sleeve portions 10-1 and 10-2 takes place via conically-shaped ends, respectively a concave end for the first portion 10-1 and a convex end for the second portion 10-2, presenting an inner conical surface for the first portion 10-1 and an outer conical surface for the second portion 10-2, both conical, surfaces having the same angle at the apex. In this embodiment, when the second tubular sleeve portion 10-2 is bonded by electrofusion against the end of the lining 2 inside the pipe element $1_1$, the chamfered end of the first portion 10-1 of the tubular sleeve may engage like a wedge in the empty angular space 10-4 so that the concave conical inner surface of the first sleeve portion 10-1 in abutment against the conical convex outer surface at the end of the second tubular sleeve portion 10-2 constitutes the greatest possible area of contact for electrical welding between the two portions 10-1 and 10-2 of the tubular sleeve, so that the electrical welding is stronger.

In FIG. 8A, it can be seen that the conical concave inner surface of the first portion 10-1 is covered by a spiral-wound heater wire 6, thus snaking it possible for the two portions 10-1 and 10-2 to be welded together by electrofusion.

FIGS. 9A to 9B show how two unit lengths of lined pipe are assembled together during on-site installation performed on board a laying ship 13*a* that is fitted with a J-lay tower 13*b*, as shown in FIG. 9A. For this purpose, the terminal pipe element $1_1$ of an already-laid lined pipe is held securely in suspension at the foot of the tower, as shown in FIG. 9B. A tubular junction sleeve, e.g. of the type shown in FIG. 1, is then inserted. An expandable mandrel 20 is then inserted in order to perform electrofusion of the joint between the tubular sleeve 3 and the internal lining 2 at the surface of revolution 2*a*.

The mandrel 20 is shown in detail in FIG. 9E. It is of the expandable type and comprises a rigid core 21 in the form of a rim, e.g. made of composite material, an expandable membrane, e.g. an inner tube 22 that can be inflated by means of an umbilical 23 fed with compressed air, said umbilical also conveying electricity to a power supply connector 20*a*. Said mandrel, is shown in the top portion of said FIG. 9E in its expanded position 22*a* and in the bottom portion in its retracted position 22*b*. The mandrel 20 is thus inserted inside the tubular junction sleeve 3 so as to position the connector 20*a* facing the complementary connector 7 of said tubular junction sleeve. Thereafter the mandrel 22*a* is expanded and electricity is injected so as to fuse the entire zone that is covered by the heater wire. In conventional manner, this performs welding by electrofusing the plane of contact between the tubular junction sleeve 3 and the lining 2. The expandable mandrel 20 is advantageously expanded with high pressure, thereby making it possible to guarantee excellent compactness in the fusion plane, thus ensuring there are no bubbles of air, which would be harmful in terms of obtaining good, sealing at the fusion surface.

As shown in FIG. 9B, a new lined pipe element $1_2$ is transferred in conventional manner from the horizontal position to the oblique position corresponding to the angle of inclination of the tower so as subsequently to be positioned on the axis of the sleeve and of the terminal pipe element $1_1$ at the end of the string being laid. Said pipe element $1_2$ that is to be assembled is then moved axially towards the suspended terminal pipe element $1_1$. The top portion of the sleeve 3 forms a male end $1_1a$ of the pipe element $1_1$ and penetrates into the female end $1_2a$ of the pipe element $1_2$ that is so be assembled, until the terminal portion 3*b* of the sleeve comes into contact with the terminal portion 2*a* of the lining inside the pipe element $1_2$. Since the pipe element $1_2$ is close to being vertical, its own weight then suffices to enable the sleeve to penetrate completely into the lining so as to reach the configuration of FIG. 3C, in which the two pipe elements $1_1$ and $1_2$ are held apart by a few millimeters, e.g. merely by spacers (not shown), so as to make it possible in conventional manner to perform the welding 5 by means of an orbital welding robot 5*a* known to the person skilled in the art. FIG. 9C also shows on the left and towards the top, the chamfered steel pipe walls $5_1$ that are a few millimeters apart during welding, and the screen 9 constituted by a mat of ceramic foam limiting the transfer of heat and protecting the thermoplastic sleeve throughout the duration of the welding process. On the right-hand side, the finished weld 5 is shown.

Finally, as shown in FIG. 9D, an expandable mandrel 20 is inserted from the top end of the string $1_2$ and positioned in such a manner as to enable the movable electrical power supply connector 20*a* to face one receiving connector 7 of the tubular junction sleeve, and then the mandrel is expanded and the junction is electrofused, as described above.

In the event of an accident during on-site installation, it may be necessary to cut a faulty weld off the pipe. Under such circumstances, the pipe and the tubular junction sleeve already in place are cut through at a distance of about 15 centimeters (cm) to 20 cm from said weld, and then a new chamfer is made on the steel pipe, after which a machine similar to the machine 12 of FIG. 6B is used to destroy the remaining portion of the tubular junction sleeve with the heater spiral, and then a new terminal junction portion is machined at the end of the lining, which may be of the conical type, or of the frontal type, or indeed of the cylindrical type. A new tubular junction sleeve is then reinserted and laying of the next pipe element or string is taken up in the manner described above.

The invention claimed is:

1. A tubular junction sleeve of thermoplastic material suitable for being inserted inside a pipe comprising at least two steel pipe elements that are internally lined with a thermoplastic material where the ends of the two welded together pipe elements are assembled end to end, said sleeve presenting at each end a tubular wall terminal portion of thickness that is smaller than the thickness of the adjacent running portion of the tubular wall of said sleeve, said sleeve presenting a Joule effect heater wire at at least one of said terminal portions of the sleeve, and preferably at each of them, the wire being arranged in a spiral at the outer surface of said terminal portion of said sleeve, wherein said heater wire is folded in half so as to form a double spiral made up of two wire portions arranged side by side forming two substantially equidistant spirals that are joined together at a common end constituted by a hairpin-bend, each spiral traveling along said outer surface of each terminal portion of the sleeve from the first end of the spiral closest to the inner surface of the tubular wall of the sleeve towards a second end of the spiral constituted by said common hairpin-bend end, said second end of the spiral being closer to the outer surface of the running portion of the sleeve adjacent to said terminal portion of the sleeve, the two non-spiral-wound free ends of the two portions of the wire at said first ends of the two spirals preferably being at the inner surface of the sleeve, said two free ends of the two portions of the wire at said first ends of the double spiral including two electrical power supply terminals of said wire and thus being capable of being united side by side with a common electrical connector at the inner surface of the sleeve.

2. The tubular junction sleeve according to claim 1, wherein said spiral-wound wire for Joule effect heating is situated at the right frontal ends of said sleeve.

3. The tubular junction sleeve according to claim 1, wherein said terminal portion of the sleeve defines an outer surface of revolution of outside diameter smaller than the outside diameter of the adjacent running portion of the sleeve and a cylindrical inner surface of substantially the same inside diameter as the inside diameter of said running portion of the sleeve, said Joule effect heater wire running along the entire periphery of said outer surface of revolution around its axis of revolution and over at least a portion of the length of said terminal portion in the direction of said axis of revolution.

4. The tubular junction sleeve according to claim 3, wherein said two free ends at said first ends of the two spirals of the double spiral are situated at the side closest to the nearest end of the sleeve.

5. The tubular junction sleeve according to claim 3, wherein said outer surface of revolution of the smaller-thickness terminal portion of said sleeve covered by said heater wire is frustoconical in shape.

6. The tubular junction sleeve according to claim 3, wherein said outer surface of revolution of the terminal portion of smaller thickness of said sleeve covered by said heater wire is of cylindrical shape having the same axis as said sleeve.

7. The tubular junction sleeve according to claim 1, wherein:
said sleeve is made by assembling together by fusion, preferably by electrofusion, surfaces at the mutually-contacting ends of at least two tubular portions of said sleeve comprising at least:
a first tubular sleeve portion having a running sleeve portion and a central sleeve portion, the central sleeve portion being of outside diameter, and preferably also of inside diameter, that are of dimension(s) smaller than the outside diameter, and preferably also respectively the inside diameter, of the adjacent running portion, more preferably said first tubular sleeve portion being obtained by machining a tubular sleeve of greater thickness; and
at least one second tubular sleeve portion having a terminal tubular sleeve portion preferably presenting a length that is shorter than said first tubular portion in the axial direction XX' of the sleeve, and preferably presenting a cylindrical inner surface, and more preferably said second sleeve portion being obtained by molding; and
the ends of said first and second assembled together tubular sleeve portions presenting shapes that are identical or complementary in their contact zone, with at least one of said surfaces being covered by a said Joule effect heater wire wound in a double spiral and having its free ends leading to the inner surface of said tubular sleeve portion.

8. The pipe comprising at least two steel pipe elements internally lined with thermoplastic material and assembled end to end, the ends of two pipe elements being welded together, wherein a said tubular junction sleeve according to claim 1 is interposed inside the pipe at the abutting ends of the two pipe elements so that the terminal portions at the ends of said sleeve are at least in part in leaktight contact with the respective terminal portions at the ends of said internal linings of the two pipe elements, said leaktight contact zone being a zone of fusion-welding between the materials constituting each of said terminal portions of the sleeve carrying said heater wire in a double spiral and each of said respective terminal portions of said lining in contact therewith.

9. The pipe according to claim 8, wherein said spiral-wound wire for Joule effect heating is situated at right frontal ends of said sleeve and of said lining in abutment one against the other.

10. The pipe according to claim 8, wherein:
said internal lining presents, at at least one end, a terminal portion of thickness that is smaller than the thickness of the running portion of said lining, defining a concave shape with an inner surface of revolution of inside diameter that is greater than the inside diameter of the running portion of said lining; and
said sleeve presents, at at least one end, a terminal portion of thickness that is smaller than the thickness of the adjacent running portion of said sleeve, said terminal portion of the sleeve defining a convex shape suitable for extending over the smaller-thickness concave terminal portion of said lining with which it is in contact, said terminal portion of the lining defining an outer surface of revolution of outside diameter less than the outside diameter of the adjacent running portion of the sleeve and a cylindrical inner surface having substantially the same inside diameter as said running portions of the lining and of the sleeve, said Joule effect heater wire extending over the entire periphery of said fusion zone around its axis of revolution and over the entire length of said fusion zone in the direction of said axis of revolution.

11. The pipe according to claim 10, wherein said two free ends of said heater wire are situated on the side of said fusion zone that is the closest to the nearest end of said sleeve.

12. The pipe according to claim 10, wherein said inner surface of the smaller-thickness terminal portion of the lining and said outer surface of the smaller-thickness terminal portion of the sleeve that are in contact one against the other are of the same frustoconical shape about the common axis of said sleeve and of said pipe.

13. The pipe according to claim 10, wherein said inner surface of the smaller-thickness terminal portion of the lining and said outer surface of the smaller-thickness terminal portion of the sleeve that are in contact one against the other have the same cylindrical shape about the common axis of said sleeve and said pipe, with the end of the smaller-thickness terminal portion of the sleeve preferably abutting against a shoulder defining the inner surfaces of said running portion and of said smaller-thickness terminal portion of the lining.

14. A method of making a pipe according to claim 8, the method comprising the following steps:
1) assembling together pipe elements including a said lining with a terminal portion of smaller thickness at each end, and a said tubular junction sleeve inserted into only one end of each said pipe element and projecting therefrom, the projecting sleeve defining a male end for each pipe element suitable for being assembled with an end not having a said sleeve and defining a female end of another said pipe element by axially engaging and forcing in the longitudinal direction said female end not having a tubular junction sleeve of a pipe element for assembly around the male end having a tubular junction sleeve fastened thereto that projects from the terminal pipe element of a pipe that is being assembled, until said terminal portion of the sleeve of said male end of said terminal pipe element is in contact with said terminal portion of the lining of said female end of said pipe element for assembly, each said sleeve including on each of said terminal portions of the sleeve a said Joule effect heater wire wound in a double spiral, then
2) electrically powering said heater wire, preferably while simultaneously exerting pressure between said contacting sleeve terminal portion and said lining terminal portion in order to provide a said zone for welding by electrofusion in at least a portion of the interface at the surfaces of each said sleeve terminal portion and each said lining terminal portion in mutual contact and having the heater wire double spiral running thereover at the surface of the sleeve in order to provide a said zone of leaktight contact by fusion; and 3) welding together the ends of the two abutting pipe elements.

15. The method according to claim 14, wherein:

a) in a central portion, said sleeve presents an outside diameter that is less than the outside diameters of the running portions adjacent to said central portion so as to leave an annular space between the sleeve and the wall of said pipe elements, and an annular thermal protection part is placed therein suitable for protecting the sleeve while the ends of the pipe elements are being welded together, said running portions of the sleeve preferably presenting an outside diameter that is substantially identical to the inside diameter of the ends of the assembled-together pipe elements that are not covered by said lining; and b) the tubular wall of said sleeve presents thickness that is substantially constant in its said adjacent running portions and substantially equal to the thickness of the running portion of said internal lining, and said central portion of the sleeve, which is preferably of smaller thickness, is suitable for deforming so as to adopt an inside diameter that is substantially identical to the inside diameter of the remainder of the sleeve under the effect of an internal pressure of at least 1 MPa of the fluid that flows inside the pipe in operation, and the thermal protection part is itself also deformable under the same pressure conditions preferably so as to adopt a thickness of less than 5 mm, and more preferably of less than 2 mm, said thermal protection part more preferably being constituted by ceramic fibers; and c) said pressure is exerted against the inner surface of the sleeve at its said terminal portion by inserting a device comprising an inflatable cell inside the sleeve, said cell initially being at least partially deflated, and preferably including or co-operating at its surface with an electrical power supply connector that is positioned in such a manner that said electrical connector of the cell can co-operate, when said cell is inflated, with the electrical connector on the inner surface of the sleeve and including the terminals of the heater wire, and then inflating said cell.

* * * * *